W. H. SCOTT.
ELECTRIC MOTOR OR DYNAMO.
APPLICATION FILED MAY 20, 1915.

1,295,613.

Patented Feb. 25, 1919.

INVENTOR
WILLIAM HARDING SCOTT.
BY Hinman and Hinman
ATTORNEYS

UNITED STATES PATENT OFFICE.

WILLIAM HARDING SCOTT, OF NORWICH, ENGLAND.

ELECTRIC MOTOR OR DYNAMO.

1,295,613.   Specification of Letters Patent.   Patented Feb. 25, 1919.

Application filed May 20, 1915. Serial No. 29,378.

*To all whom it may concern:*

Be it known that I, WILLIAM HARDING SCOTT, a subject of the King of Great Britain, residing at Gothic Works, Norwich, in the county of Norfolk, England, have invented new and useful Improvements in Electric Motors or Dynamos, of which the following is a specification.

My invention relates to electric motors, or dynamos, especially those intended for starting, or igniting, the internal combustion engines of motor road-vehicles, and for other purposes where the weight should be as small, and the arrangement as compact, as possible, although it is not limited to these.

I may remark that I prefer to use a number of poles not, in any case, less than four, while for starting-motors fixed on the crankshaft, or gear-box shaft, I prefer that the number of poles shall not be less than eight and it may even, in some cases, be as many as sixteen.

According to my invention I make, for such armatures, conductors of many bare wires, laid up with but little, or no, twist, or lay, and insulated by insulation having some flexibility, such, for example, as braided insulation, so that the cross-sectional form of the insulated conductors can be altered by moderate pressure applied thereto when the conductors are in the slots in the armature, and the conductors will be packed into the slots much more closely than will ordinary conductors of any practicable shape, and the conductors, according to my invention, will pack into, and effectually fill, slots which are wider at the top than at the bottom, and thus enable much more conductor to be used on a given armature than could otherwise be the case, although, if desired, the conductors, made as described, can be packed, with advantage, into parallel-sided slots. To as far as possible prevent humming I make the slots closed, or nearly closed, at top, and in combination with the foregoing I prefer to use the method of winding the armature, which is hereinafter described.

I will describe, with reference to the accompanying drawing, how my invention may be performed, but I do not limit myself to the precise details of such construction.

Figure 1:
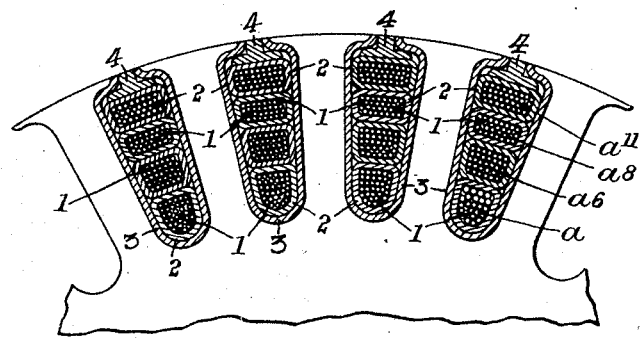
Figure 2:
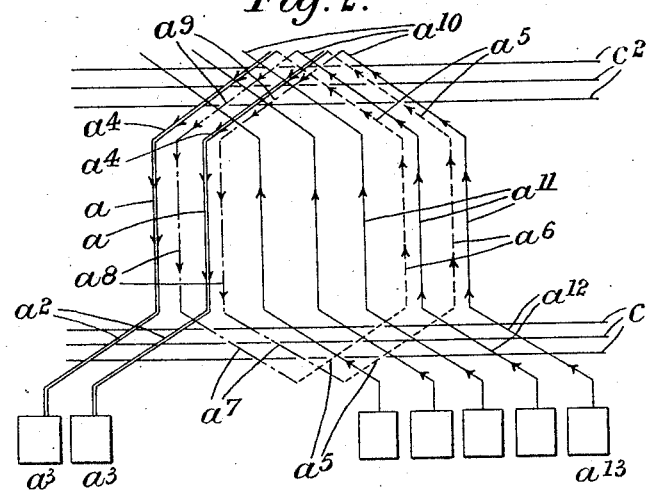

Figure 1 is an elevation of part of the armature with the windings in section and Fig. 2 is a developed diagram showing the method of winding the armature.

The conductors constituting the armature windings are each made up of bare wire, indicated at 1, laid up with but little, or no, twist, or lay, and around each collection of such wires, constituting a conductor, flexible insulation, (indicated at 2), is applied, by braiding, or in other convenient manner. The conductors thus made are packed into the slots as shown in Fig. 1 with sufficient pressure to cause the conductors in each slot to take a cross-sectional shape in accordance with the width of the slot at the parts where the respective conductors are situated and the collection of conductors in each slot will thus be caused to fill it, and give a maximum of conductive metal in each slot. The slot insulation 3 may consist, for example, of hard cardboard placed in each slot before the conductors are introduced. 4, indicates a slip of wood, or other suitable material, placed above the outermost conductor in the space, in each slot, left when that conductor has been pressed into position.

I have shown the slots as taper slots, they being wider at the outer parts than at the inward parts, but, as aforesaid, if desired, conductors, made as aforesaid, may be applied to other slots, such as slots with parallel sides, and consequently, of the same width throughout.

The slots 1, are preferably nearly closed at top as illustrated.

In the diagram Fig. 2, I have shown sufficient of the conductors to illustrate the method of winding the armature which I prefer to employ. The conductors for the whole of the armature are in a number of lengths corresponding to the number of the sections of the commutator, each length being sufficient for the number of turns per section. One end of each of these lengths is laid in the bottom of a slot as indicated in double full lines at $a$, this portion of the conductor being pressed and compacted (by any suitable tool, or other means) into the slot so that the said part of the conductor is compressed, or squeezed, into the lower part of the slot which it is thus caused to fill as completely as possible. A sufficient portion of the conductor is left, at the commutator end, to reach the commutator section ($a^3$); after the said end has been bent to the left as indicated at $a^2$ and these bent ends are bound down by binders indicated at $c$, and, at the other end of the armature viz:—that opposite the commutator, the lengths of conductors are bent over, as indicated (bent to the right) at $a^4$ which, in the case of wave winding, will be in the opposite direction to that of the commutator end bends. This is done with each conductor, in each slot, all around the armature, and these bent ends are bound down by binders indicated at $c^2$. Each conductor is then bent back over the binder, as shown in dotted lines at $a^5$, and made to cross diagonally over the first layer of end conductors, and is laid in the slot which corresponds most nearly with the pitch of the magnet pole-pieces as indicated at $a^6$ and is also pressed into the slot to fill completely the part thereof which it occupies making the second layer of conductors in the slots. The conductors are then given a bend at the commutator end of the armature as indicated by the dotted lines turning to the left at $a^6$, and then are bent, as indicated at $a^7$, and the portion at $a^8$, is put into the slot and compacted therein making the third layer of conductor in the slot, as aforesaid, and the process of bending, and of compacting in the slots, is repeated, as indicated by the lines $a^9$ $a^{10}$, and the fourth layer in the slot $a^{11}$. This forms a two turn winding and the conductor is then in a wave winding, bent to the right and taken to the commutator sections (indicated at $a^{13}$), as will be understood by any one conversant with the art. More turns per section may obviously be used though the arrangement is intended more especially for application to armatures wound with but a small number of turns per section, as, for practical reasons, it is not so suitable for a large number of turns because of the length of the separate conductors which would then be required.

The aforesaid method of winding, when used in connection with the conductors hereinbefore described, has advantages (for the special kind of work in which a comparatively low voltage is used) as regards reliability of the work when finished, owing to its being possible to effect the winding with a minimum risk of damaging the insulation of the conductors and also it has especial advantages in consequence of the large amount of copper which can be got onto any given size of armature, this being due to the fact that the conductors are made of bundles of bare wires with no twist, or practically no twist, in them insulated as bundles with a sufficiently flexible covering such as braided cotton, which bundles, when pressed turn after turn forcibly into the slots, fill said slots to their full capacity even when the slots are of irregular shape, and each of the turns in a slot has to be pressed into a different shape.

What I claim is—

1. An armature having a core provided with radial, outwardly flared slots constricted at their outer ends, and a winding comprising for each slot a series of radially superposed, insulated, bundles of bare, substantially untwisted, wires compressed into the slot to substantially fill the latter, and a plug inserted within the constricted outer end of the slot to hold the bundles compacted therein.

2. In an armature, a core member slotted to form spoke-like arms of practically uniform cross section substantially throughout their length, and a winding for each slot comprising radially superposed, insulated, bundles of bare wires compressed into the slot to substantially fill the latter, together with means for holding said bundles compacted in the several slots.

3. The method of winding an armature having a slotted core which comprises pressing successive turns of an insulated bundle of bare, substantially untwisted, wires in the armature slot, laying thereon in similar manner a radially superposed, insulated, bundle of wires of like type, repeating this procedure until the slot is practically filled with such bundles and applying means for holding the bundles compact in the slot.

In testimony whereof I have signed my name to this specification in the presence of two subscribing witnesses.

WILLIAM HARDING SCOTT.

Witnesses:
GILBERT FLETCHER TYSON,
EDWARD GEORGE DAVIES.

Copies of this patent may be obtained for five cents each, by addressing the "Commissioner of Patents, Washington, D. C."